(12) United States Patent
White et al.

(10) Patent No.: US 6,353,413 B1
(45) Date of Patent: Mar. 5, 2002

(54) MULTI-FUNCTION UNIVERSAL CONTROLLER AND LOCATOR SYSTEMS

(76) Inventors: Stanley A. White, 433 E. Avenida Cordoba, San Clemente, CA (US) 92672; Kenneth S. Walley, 19262 Shadow Oak Dr., Portola Hills, CA (US) 91679; James W. Johnston, 11 via Solano, Rancho Santa Margarita, CA (US) 92688; P. Michael Henderson, 12450 Butler Way, Tustin, CA (US) 92782; Kelly H. Hale, 4 Cancun, Aliso Viejo, CA (US) 92656; Warner B. Andrews, Jr., 754 16th St., Boulder, CO (US) 80302; Jonathan I. Siann, 12501 Dormhouse Rd., San Diego, CA (US) 92129

( * ) Notice: Subject to any disclaimer, the term of this patent is extended or adjusted under 35 U.S.C. 154(b) by 0 days.

(21) Appl. No.: 09/358,999

(22) Filed: Jul. 22, 1999

Related U.S. Application Data (62) Division of application No. 08/920,742, filed on Aug. 29, 1997.

(51) Int. Cl.[7] .................................................. G01S 3/02
(52) U.S. Cl. ....................................................... 342/453
(58) Field of Search ................................. 342/387, 386, 342/450, 457, 465, 453, 394, 395, 393; 455/456

(56) References Cited

U.S. PATENT DOCUMENTS

| 3,680,121 A | * | 7/1972 | Anderson et al. | 342/457 |
| 3,886,553 A | * | 5/1975 | Bates | 342/456 |
| 4,799,062 A | * | 1/1989 | Sanderford, Jr. et al. | 342/450 |
| 4,812,852 A | * | 3/1989 | Bent et al. | 342/457 |

* cited by examiner

*Primary Examiner*—Thomas H. Tarcza
*Assistant Examiner*—Fred H. Mull
(74) *Attorney, Agent, or Firm*—Lyon & Lyon LLP

(57) ABSTRACT

A controller that communicates with a first set of devices and a second set of devices is disclosed. The controller includes a transmitter for transmitting commands to remotely control the first set of devices, and for communicating input/output (I/O) data with the second set of devices. A microphone, speaker, display and cellular and cordless phone circuitry are integrated into the controller to provide the controller with phone and paging capabilities. Systems for determining the spatial location of a target object are also disclosed. The spatial location of the target object is determined with reference to a predetermined spatial reference point based on measured elapsed times, which represent the difference between a time reference and the time of receipt of a location signal from the target object at the known locations.

13 Claims, 6 Drawing Sheets

MULTI-FUNCTION UNIVERSAL CONTROLLER AND LOCATOR SYSTEMS

CROSS-REFERENCE TO RELATED APPLICATIONS

This application is a divisional of application Ser. No. 08/920,742, filed Aug. 29, 1997 for Multi Function Universal Controller and Locator System.

BACKGROUND OF THE INVENTION

1. Field of the Invention

The present invention relates generally to the field of remote controls, and in particular, to a universal controller with multi-function capabilities. The present invention further relates to locator systems for determining the spatial location of a target object.

2. Description of Related Art

Hand-held devices for remotely controlling household appliances are generally known in the prior art. For example, household appliances (e.g., a television (TV), a video cassette recorder (VCR), a stereo system, and others) each often include a corresponding remote control unit that is adapted to control the operations of the appliance.

However, prior art remote control units suffer from several disadvantages. First, each device or system requires a specific and different remote control unit. Although there have been attempts to integrate the functions of several remote control units into a single remote control unit that controls several devices, these efforts are limited to intimately related functions and devices. For example, one remote control unit has been provided for controlling the VCR and TV. Similarly, one remote control unit has also been provided for controlling a CD player and an amplifier. However, there are no prior art remote control units that can control virtually all the diverse systems, appliances and devices found in a home. More importantly, there are no remote control units that can communicate input/output (I/O) data.

Second, an individual typically has a pager, a cellular phone, a cordless household phone, a garage door opener, a security system unit, a laptop computer, a personal digital assistant (PDA), remote control units for different household appliances, as well as other devices providing other functions. It would be desirable to have a remote control unit that integrates the functions and capabilities of some or all of the devices identified above. Otherwise, a home can become cluttered with all these portable devices. Because of the portability, number, and relatively small size of these devices, one can easily misplace any of these devices inside the home. Unfortunately, current systems for locating objects are primitive, inaccurate and often ineffective.

For example, existing cordless phone systems employ a system, often referred to as a paging feature, that helps to find a misplaced cordless phone. Such a system includes a base unit and a cordless handset. To find the cordless handset, one presses the paging button of the base unit and a beeper in the handset sounds. However, this approach has several disadvantages. First, even if one hears the beep, it is difficult to pinpoint the location of the handset in the home. Second, if the handset is under another object, such as a pillow or sofa, one often cannot even hear the beep.

Accordingly, there remains a need for a universal controller having additional integrated capabilities, and a locator system that can determine with reasonable specificity the spatial location of a target object.

SUMMARY OF THE INVENTION

The present invention provides a universal controller with multifunction capabilities and a locator system for determining the spatial location of a target object.

One aspect of the present invention is to provide a universal remote control unit with computer input/output (I/O) interface capabilities so that the universal controller can be employed to communicate with an intelligent device, such as a PDA and a personal computer (PC).

Another aspect of the present invention is to provide a universal remote control unit with combined telephone, pager, computing and data processing capabilities.

Another aspect of the present invention is to provide a universal remote control unit adapted to control virtually all household appliances, systems and devices so that separate controls for a specific device or devices are made unnecessary.

Another aspect of the present invention is to provide a locator that includes a base unit and a plurality of detection units for accurately determining and displaying the spatial location of a target object.

The present invention provides an apparatus for communicating with a first device and a second device. The apparatus includes a transmitter for transmitting commands to remotely control the first device, and for communicating input/output data with the second device. A remote control panel is provided for inputting user remote control commands. A microphone and a speaker are also provided for receiving and presenting audio information. A phone circuit is coupled to the transmitter for providing cellular phone, cordless household phone and pager communication capabilities to the apparatus. A device is provided for viewing the input/output data, and a keyboard is provided for receiving user input. A processor is coupled to the transmitter for manipulating the I/O data, and an antenna is coupled to the transmitter.

The present invention also provides a locator system and method for determining the spatial location of a target object. The locator system includes a target object which transmits a location signal, a plurality of detection units for measuring time intervals between a time reference and the time at which the detection unit receives the location signal, and a base unit for determining the spatial location of the target object with reference to a predetermined spatial reference point based on the measured time intervals.

BRIEF DESCRIPTION OF THE DRAWINGS

The exact nature of this invention, as well as its objects and advantages, will become readily apparent from consideration of the following specification as illustrated in the accompanying drawings, in which like reference numerals designate like parts throughout the figures thereof, and wherein.

DETAILED DESCRIPTION OF THE PREFERRED EMBODIMENTS

In the following description, for purposes of explanation and not limitation, specific details are set forth in order to provide a thorough understanding of the present invention. However, it will be apparent to one skilled in the art that the present invention may be practiced in other embodiments that depart from these specific details. In certain instances, detailed descriptions of well-known data processing techniques, devices and circuits are omitted so as to not obscure the description of the present invention with unnecessary detail.

Universal Controller with Multi-Function Capabilities

Figures 1, 2:
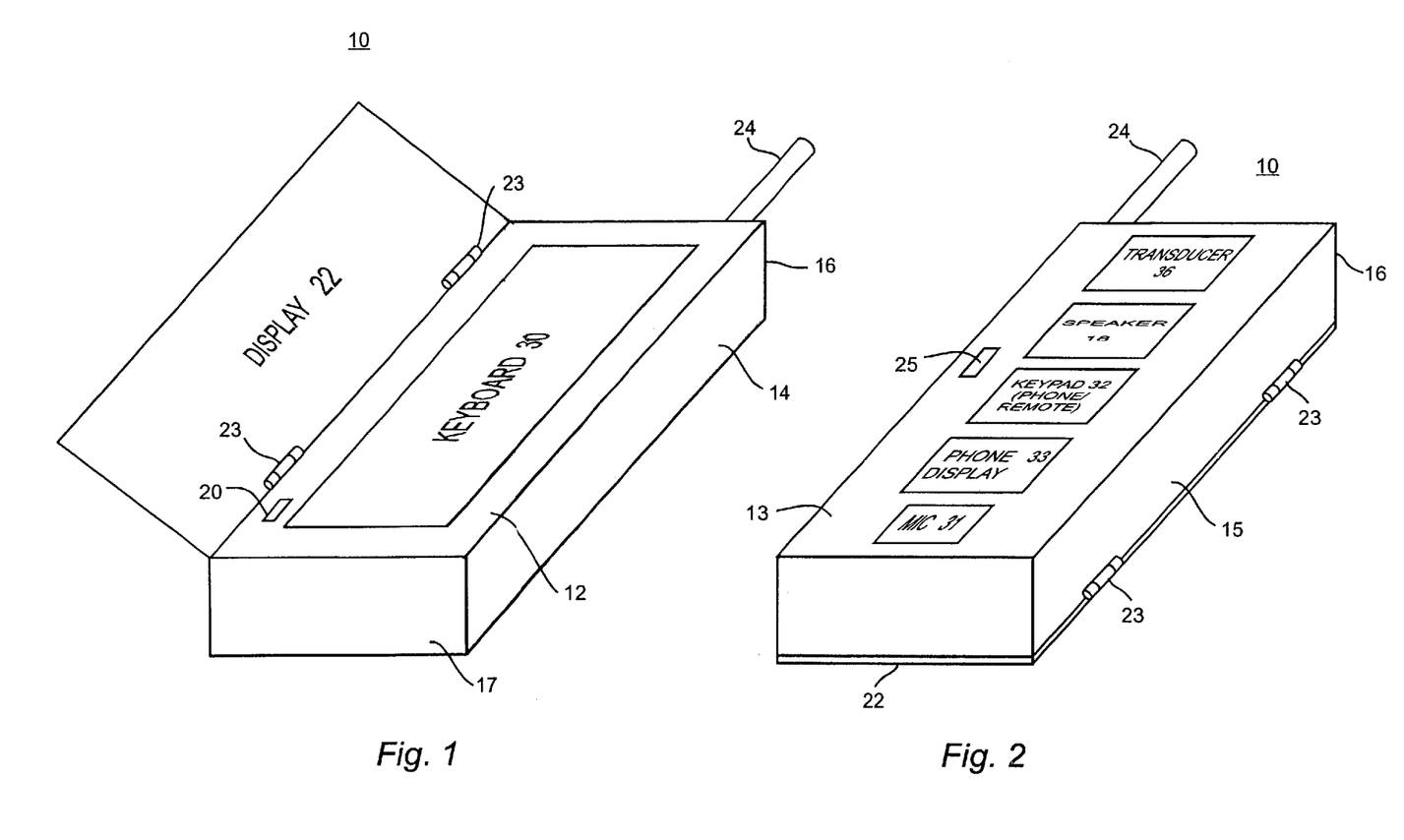
FIG. 1 is a front, right and bottom side perspective view of a universal controller configured according to a preferred embodiment of the present invention.
FIG. 2 is a back, left and bottom side perspective view of the universal controller of FIG. 1.

FIG. 1 is a front, right, and bottom side perspective view of a universal controller (UC) 10 configured according to a first preferred embodiment of the present invention. In this embodiment, the UC 10 is an integrated remote control unit (including both radio frequency (RF) and infrared (IR) capabilities), a telephone (including cellular telephone and household cordless telephone capabilities), a pager, and a computer terminal for communicating input/output (I/O) data to an intelligent device (e.g., a PDA or PC). The UC 10 includes electronics 11 that provide the integrated remote control, telephone, pager, and I/O data capabilities. The electronics 11 is described in greater detail with reference to FIG. 3.

In this embodiment, the UC 10 has a shape of a generally rectangular box having a front side 12, a back side 13, a right side 14, a left side 15, a top side 16 and a bottom side 17. A flip-up display 22 is coupled to the left side 15 via hinges 23. When in use, the display 22 can be opened into an operative position as shown in FIG. 1. When not in use, the display 22 can be closed into a non-operative position as shown in FIG. 2.

A first user-controlled switch 20 for turning on the computer terminal and a standard QWERTY keyboard 30 are disposed on the front side 12. A radio-frequency (RF) antenna 24, adapted for communicating I/O data and sound data, is disposed along the right side 14 and extends from the top side 16.

FIG. 2 is a back, left and bottom side perspective view of the UC 10 of FIG. 1. A second user-controlled switch 25 for enabling the telephone capabilities (i.e., cellular, household cordless telephone and pager) is disposed on the back side 13. A speaker 18 for presenting audio information, a microphone 31 for recording or receiving audio information, a phone display 33, and a numeric keypad 32 are also disposed on the back side 13 in a manner in which the speaker 18 and the microphone 31 are spaced-apart by the keypad 32 and the phone display 33. This spacing is required so that a user can use the UC 10 as a phone, placing the speaker 18 adjacent his or her ear while placing the microphone 31 adjacent his or her mouth. The keypad 32 serves the dual purposes of being the keypad for the remote control unit and also as the keypad employed for dialing a phone number. The keypad 32 can also include non-numeric keys that control specific features of the devices to be controlled (e.g., ON/OFF, Volume, FWD, REW, and others). The phone display 33 displays the phone number to be dialed and the paging information (i.e., phone number or other message). An infra-red (IR) transmitter 36 for transmitting commands to remotely controlled devices is disposed on the top side 16.

When communication of computer (I/O) data is needed, a user simply opens the flip-up display 22 and presses the computer switch 20. The user then employs the QWERTY keyboard 30, with the aid of the display 22, to communicate via the RF antenna 24 with a PDA, or PC, or any other device that is adapted to communicate I/O data. When telephone communication is needed, the user simply presses the phone switch 25 on the back side 13 and employs the keypad 32 and the RF antenna 24 to engage in a telephone conversation. A combined mode can be used to permit data transmissions from PC over the telephone via the UC 10. To receive a page, the user simply reads the page information from the phone display 33. For the remote control operation, a user simply employs the keypad 32 and IR transmitter 36, or RF transmitter as appropriate, to remotely control a device.

Figure 3:
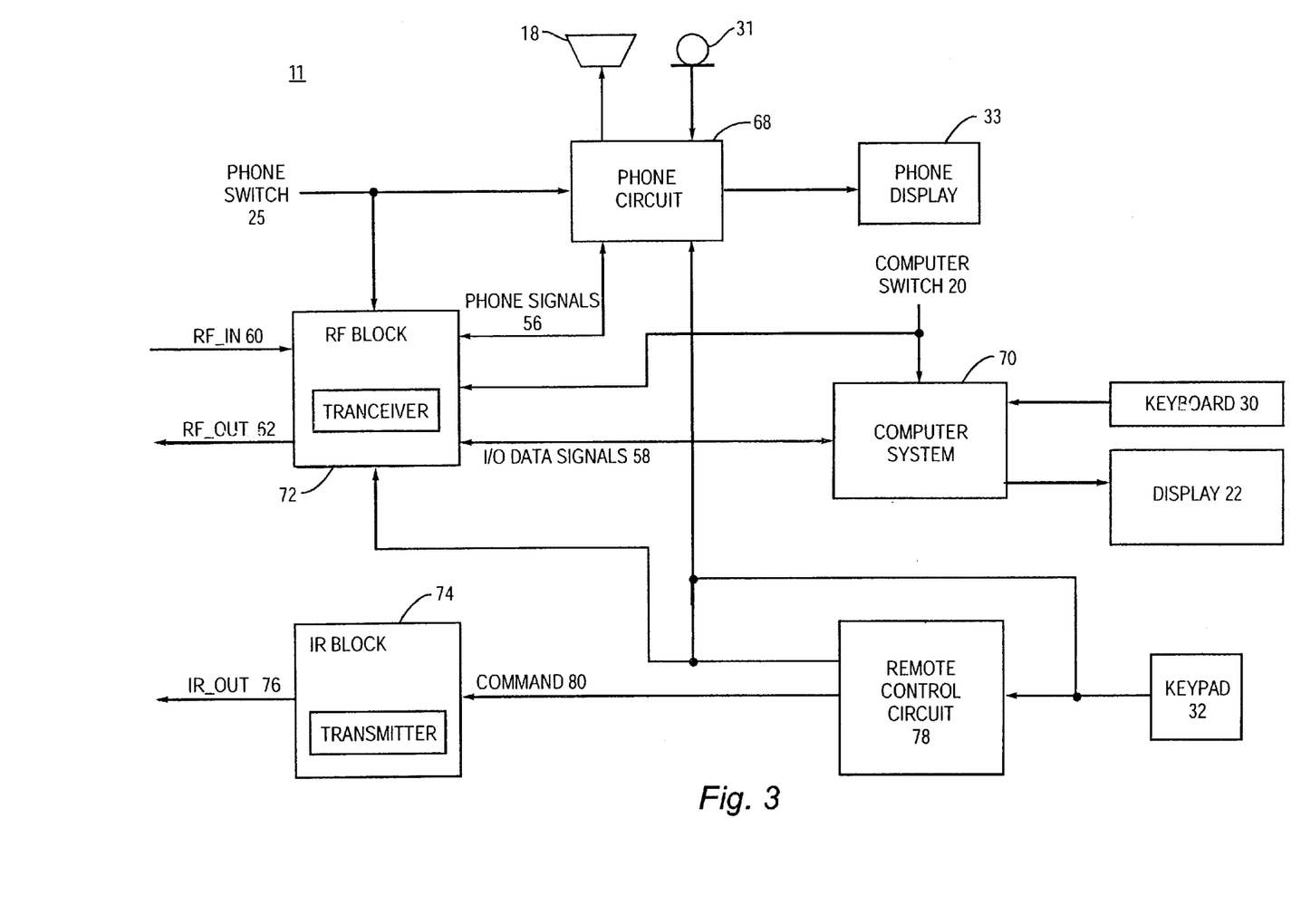
FIG. 3 is a simplified block diagram of the electronics of the universal controller of FIG. 1.

FIG. 3 is a simplified block diagram of the electronics 11 of the UC 10 configured according to a preferred embodiment of the present invention. The electronics 11 includes telephone circuit 68 that is coupled to the microphone 31, the speaker 18 and the phone display 33. The telephone circuit 68 receives audio information from the microphone 31, provides audio information to the speaker 18, and provides phone numbers and other information to the phone display 33. The telephone circuit 68 provides the cellular telephone, household cordless telephone, pager and data modem/PC capabilities for the UC 10. The keypad 32 is coupled to the telephone circuit 68 for dialing the telephone numbers and for controlling paging operations.

A computer system 70 is provided for the processing of I/O data. The computer system 70 can be intelligent (i.e., having a microprocessor and the ability to execute software programs) or dumb (i.e., serving only as a computer terminal for data input, transfer and presentation). The UC 10 includes a display 22 and a keyboard 30 that are coupled to the computer system 70. The display 22 presents information to the user. The keyboard 30 allows a user to input information to the computer system 70. The keyboard 30 includes a keyboard buffer memory (not shown) for storing the user input and a keyboard decoder (not shown) for multiplexing the output of the keyboard 30 to the computer system 70.

The electronics 11 of the UC 10 further includes a radio frequency (RF) circuit 72 for receiving RF-IN signals 60 from the RF antenna 24, and for providing RF-OUT signals 62 to the RF antenna 24. The RF circuit 72 includes an RF modem that transforms RF signals into baseband signals usable by the telephone circuit 68 and the computer system 70, and vice-versa. In other words, the computer system 70 and the telephone system 68 employ the RF circuit 72 to communicate data via the RF antenna 24 to a device capable of I/O data processing and to another telephone or paging unit. The RF circuit 72 is coupled to the telephone circuit 68 to communicate telephone signals 56 (including paging signals) therebetween. The RF circuit 72 is also coupled to the computer system 70 to communicate I/O data signals 58 therebetween. In addition, the remote control circuit 78 employs the RF circuit 72 to communicate commands to control a remote device, as explained below.

The computer switch 20 is coupled to the computer system 70 and the RF circuit 72 for enabling the computer system 70 and the RF circuit 72 for I/O data processing.

Similarly, the phone switch 25 is coupled to the telephone circuit 68 and the RF circuit 72 for enabling the telephone circuit 68 and the RF circuit 72 for telephone and paging operations.

The computer system 70 and the RF circuit 72 together provide the UC 10 with I/O data communication capabilities. The UC 10, as configured in FIG. 3, can communicate with a device that processes data (e.g., a PDA, a PC, or a CD ROM reader). Those skilled in the art will realize that the PDA, PC or other host data I/O device that processes I/O data will require an RF modem and antenna to effectively communicate with the UC 10.

The electronics 11 of the UC 10 further includes an infra-red (IR) circuit 74 that receives a command 80 from the remote control circuit 78 and transmits an IR signal representing the command to a remotely controlled device. The remote control circuit 78 is configured to control multiple devices and diverse systems. For example, the remote control circuit 78 is configured to control multiple devices and diverse systems. For example, the remote control circuit 78 is adapted to control systems, which can include, but are not limited to the garage door opening, the security system unit, the television, the stereo system, the microwave, the CD player, and the radio. The keypad 32 is also coupled to the remote control circuit 78 for controlling the operations of the desired device. The remote control circuit 78 is also coupled to the RF circuit 72 to transmit RF signals to control remote devices that are adapted to receive commands in RF.

Each of the functional electronic blocks referred to in FIG. 3 are known by those skilled in the art, and accordingly the details of these blocks are not provided. These blocks can be implemented by off-the-shelf components or by specifically designed parts. Moreover, it will be understood by those skilled in the art that one or more of the functional blocks may be integrated and or partitioned to suit the needs of a specific design or application.

Locator Systems

A locator system configured according to a first preferred embodiment of the present invention is described with reference to FIGS. 4–5. A locator system configured according to a second preferred embodiment of the present invention is described with reference to FIGS. 6–7. The locator systems, unlike prior art locators, accurately determine the spatial location (i.e., the location with respect to three axis or dimensions) of an object 124 and enables one to quickly and easily find the object 124. The object 124 to be located is hereinafter referred to as a "target object."

The target object 124 can be, but is not limited to, a person, a pet, a garage-door opener, a PDA, a lap-top computer, a cordless phone handset, a cellular phone, a pager and remote control units, even including the UC 10 itself. Each locatable object (i.e., a target object) is assigned an object-identification (ID) code and is equipped with an RF transceiver 128 (hereinafter also referred to as a "transponder") that responds to an interrogation (IS) signal 120 that contains its ID code and, in response thereto, generates a location signal (LS) 130.

1. First Locator System

Figure 4:
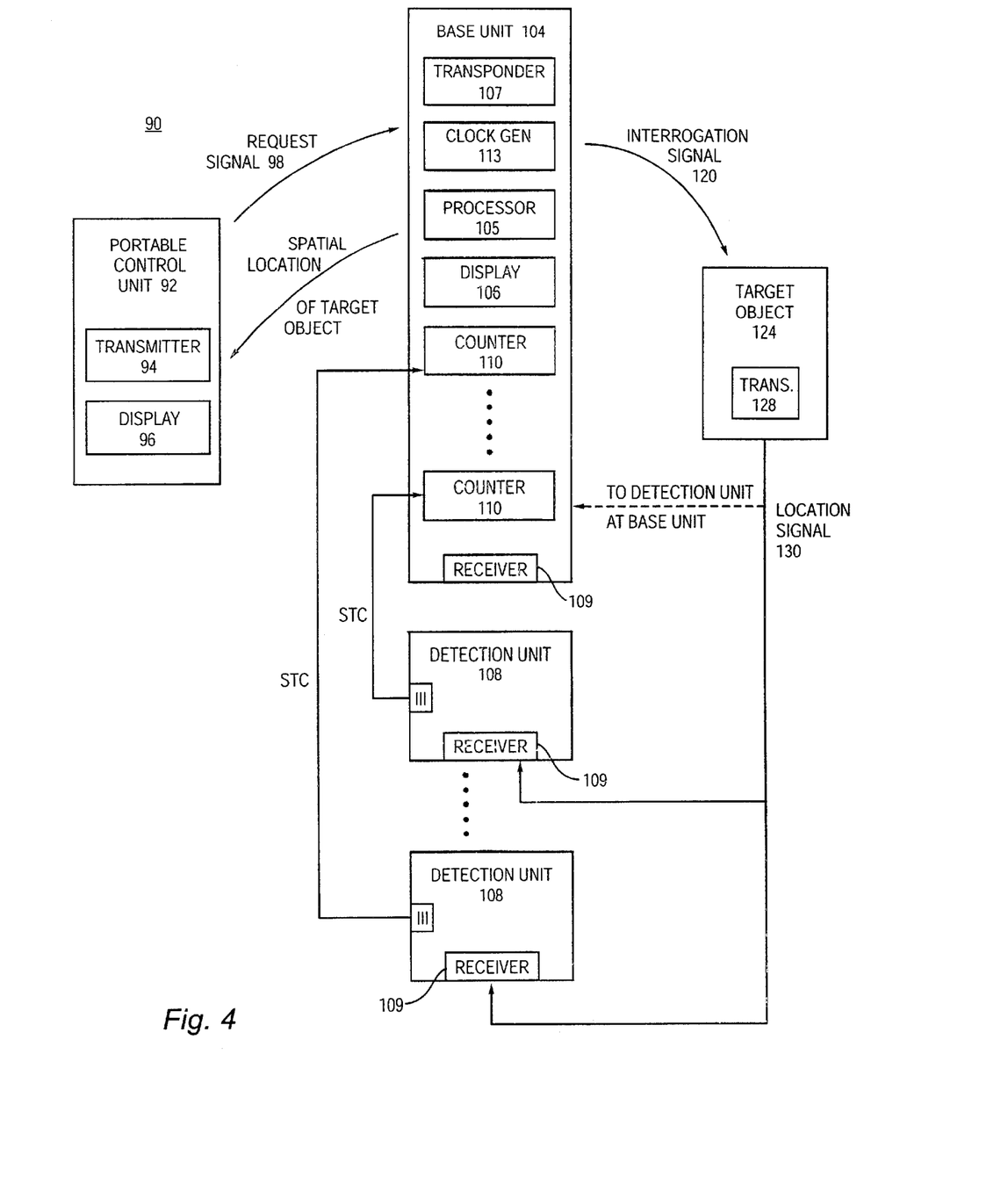
FIG. 4 is a simplified block diagram of a locator system configured according to a first preferred embodiment of the present invention.

FIG. 4 is a simplified block diagram of the locator system 90 configured according to a first preferred embodiment of the present invention. The operation of this system 90 is illustrated in the flow-chart of FIG. 5.

The locator system 90 includes a portable control unit (PCU) 92 (which can be the UC 10), a base unit 104, and a plurality of detection units 108. The ID code for each locatable object is stored at the PCU 92 and the base unit 104. The PCU 92 includes a transmitter 94 for sending a request signal (RS) 98, which contains the ID code for the target object 124 to be located, to the base unit 104. The base unit 104 then transmits this ID code in the form of an interrogation signal (IS) 120 to the target object 124. The PCU 92 also includes a display 96 for displaying the spatial location of the target object 124.

As noted previously, the target object 124 includes a transponder 128 that, in response to the IS 120, sends a location signal (LS) 130 to the base unit 104 and the detection units 108.

In this embodiment, each detection unit 108 is configured with a receiver 109 for receiving the LS 130, and a wideband line driver 111 for transmitting a "stop count" (STC) signal to a designated counter 110 located in the base unit 104. A total of five detection units 108 are preferably provided in this embodiment.

The base unit 104 includes a plurality of counters 110, each adapted to receive a STC signal from a designated one of the detection units 108. The base unit 104 is coupled (e.g., hard-wired or coupled via radio frequency) to each of the detection units 108 for receiving the STC signal. Each counter 110 records the difference between the time the counters are started and the time the STC signal is received by the corresponding counter in base unit 104, which may be hereinafter referred to as "times of arrival" or "TOAs."

The base unit 104 includes a processor 105 for determining the spatial location of the target object 124 based on these TOA measurements. The specific system of equations that are solved to determine the spatial location (X,Y,Z) of the target object 124 with respect to a predetermined reference point (0,0,0) is described in greater detail hereinafter. The base unit 104 also includes a display 106 that can be employed to display the spatial location of the target object 124. In addition, the base unit 104 can employ a transponder 107 to transmit the spatial location to the PCU 92 for display thereat.

The base unit 104 can also house one of the detection units 108. In the preferred embodiment of the present invention, the base unit 104 includes a detection unit 108 and a receiver 109, and therefore acts as a detection unit as well. With the base unit 104 acting as a detection unit 108, only four other detection units 108 are needed in this embodiment.

Figure 5:
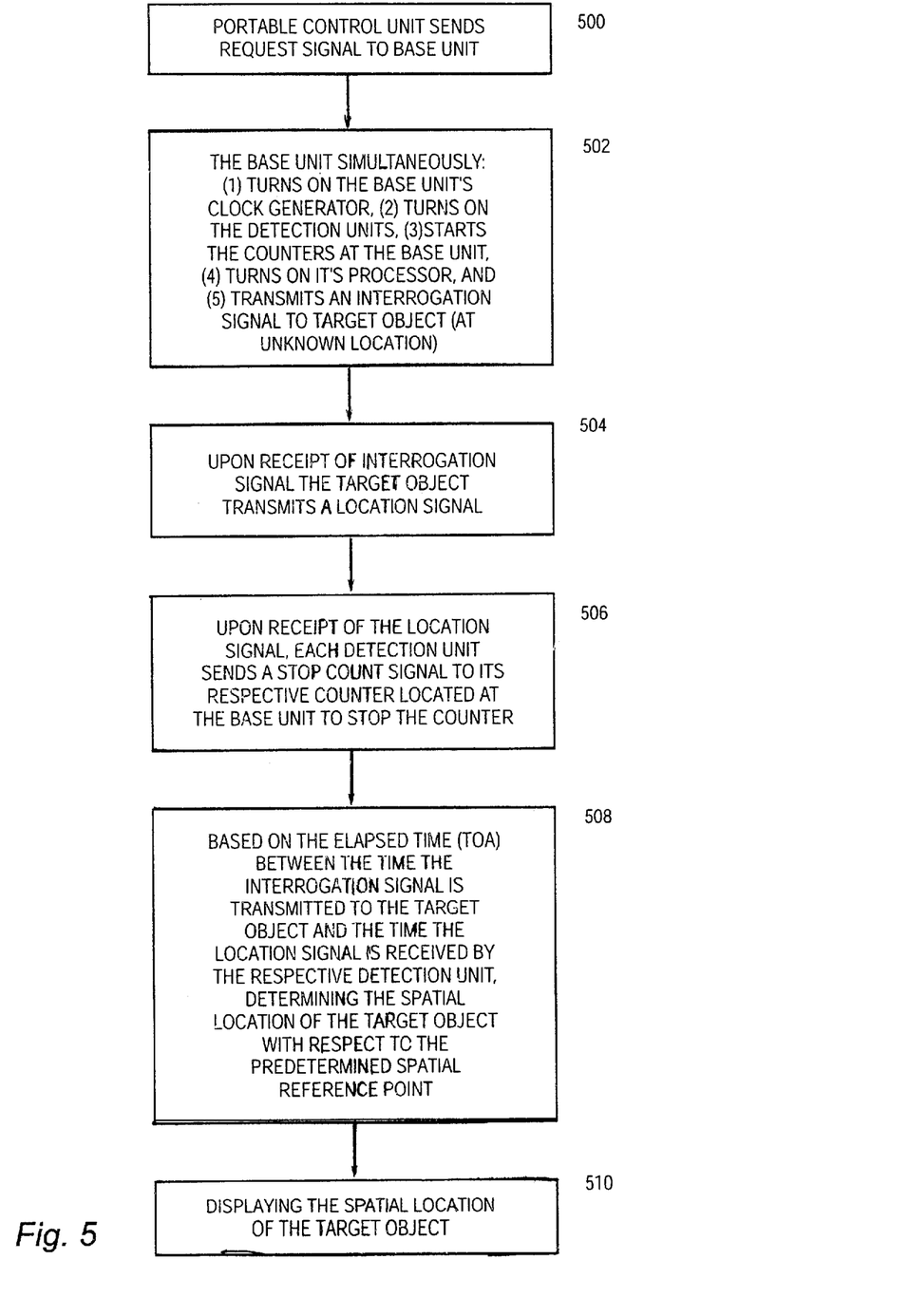
FIG. 5 is a flowchart of the method steps performed by the locator system of FIG. 4.

FIG. 5 is a flowchart of the method steps performed by the locator system 90 of FIG. 4. To use the locator system 90, a user enters the ID code of a target object 124 to be located into either the PCU 92 or the base unit 104, and then enters a "FIND" command. IF the entry is made at the PCU 92 and the ID code is recognized by the PCU 92 transmits the ID code for the selected target object 124 (in the form of a request signal (RS) and the "FIND" command to the base unit 104 by radio frequency (RF) link. Step 500 is omitted if the user makes the entry at the base unit 104.

In step 502, upon receipt of the "FIND" command, the base unit 104 simultaneously: (1) turns on the base unit's high speed (e.g., 12 GHz) clock generator 113, (2) turns on the detection units 108 which are positioned at various calibrated locations (one of which may be co-located at the base unit 104), (3) provides a "START COUNT" (SC) signal to start all the counters 110 integrated with the clock generator 113 at the base unit 104, (4) turns on its processor 105, and (5) transmits the IS 120, which is the ID code, by RF link to the transponder 128 at the target object 124. The target object 124 is at an unknown, to-be-determined, location (X,Y,Z).

In step 504, the transponder 128 at the target object 124 recognizes its ID code in the IS 120 and transmits an LS 130 to the detection units 108, which are disposed at known spatial locations ($x_m$, $y_m$, $Z_m$) with respect to a predetermined spatial reference point (e.g., (0,0,0 )).

In step 506, each of the detection units 108 detects the LS signal 130 and sends a "STOP COUNT" (STC) signal to its respective counter 110 located at the base unit 104. The value of the number in the register of each counter 110 at the time the counter 110 stops counting is a measure of the signal-propagation time (i.e., the TOA) from the target object 124 to the respective detection unit 108. After all counters 110 have stopped counting, the numbers in the registers of the counters 110 are transferred to their appropriate memory locations within the processor 105. The detection units 108, counters 110 and clock generator 113 are then turned off by the base unit 104.

In step 508, the spatial location (X,Y,Z) is determined based on the elapsed times (TOAs) with respect to the predetermined spatial reference point, such as an origin (0,0,0). Specifically the processor 105 employs the elapsed times (TOAs or counter values) and, together with calibration data for the detection units 108 stored in the processor, generates and solves a set of four linear algebraic equations whose solution identifies the location of the target object 124 in a three-dimensional spatial coordinate system. The processor 105 is pre-programmed with (1) the known locations of the detection units 108 and the base unit 104, and (2) the layout or floor plan of the house or area within which the target object 124 is expected to be found. The example below illustrates how the location of a target object 124 is determined.

The three-dimensional spatial coordinate information is then transferred from the processor 105 to the address buffer of a text-file memory. The processor 105 is then turned off by the base unit 104.

The three-dimensional spatial coordinate information serves as the address of a text-title-memory location which contains a word description of a physical location in the coordinate space (e.g., "on the sofa," "in Tommy's room," etc.) corresponding to each spatial-coordinate description. In step 510, the word description text is retrieved from the text-file memory and displayed at the display 106 in the base unit 104, or transmitted to the PCU 92 for display at its display 96, or may be displayed at both displays 106 and 96.

Alternatively, the spatial location of the target object 124 may be displayed in a three dimensional grid, at either the display 106 of the base unit 104 or the display 96 of the PCU 92, or at both displays 106 and 96.

The following example illustrates how the first preferred embodiment determines the spatial location of a target object 124. In this example, four detection units 108, also known as "receivers," are placed approximately at four corners of a rectangle, and one detection unit or receiver 108 is centered approximately ten feet above the plane of the rectangle. The base unit 104 acts as one of the receivers. The constant (c) refers to the speed of light throughout the following equations and is equal to $983.58 \times 10^6$ feet per second (fps), and the clock frequency $f_c$ is $12 \times 10^9$.

Thus, there are five receivers in locations with subscripts 0 to 4. The base unit 104 and its receiver (i.e., the first receiver) is located at ($x_0$, $y_0$, $z_0$). The target object is at the location (X, Y, Z), which is at X:=5.49; Y:=20.66; Z:=3.05.

The receiver locations are as follows:

| | | | |
|---|---|---|---|
| 1st receiver | $x_0$: = 0.72 | $y_0$: = 0.55 | $z_0$: = 0.88 |
| 2nd receiver | $x_1$: = 30.8 | $y_1$: = 0.22 | $z_1$: = 2.05 |
| 3rd receiver | $x_2$: = 32.1 | $y_2$: = 50.88 | $z_2$: = −2.59 |
| 4th receiver | $x_3$: = −1.85 | $y_3$: = 49.41 | $z_3$: = 1.02 |
| 5th receiver | $x_4$: = 15.23 | $y_4$: = 25.84 | $z_4$: = 12.07 |

Two indices are defined as follows:

m:=0 . . . 4, and n:=0 . . . 3.

The m index is employed to reference the five receivers.

The signal propagation time ($tp_m$) from the transmission of a STC signal from each of the detection units 108 to the time each corresponding counter 110 at the base unit 104 is stopped can be represented by the following equation:

$$tp_m := [(x_0 - x_m)^2 + (y_0 - y_m)^2 + (z_0 - z_m)^2]^{0.5} * 1/c$$

Using the known values and equations above, the following values are obtained for this example:

$tp$: = 0.0

0.0000000306

0.0000000614

0.0000000509

0.0000000327

In practice, these five installation-specific values have been measured during a one-time calibration test and stored as counter-correction values $C_m$", which are described below.

The unknown common delay time between the instant at which the counters 110 were started to the instant at which the target object 124 emitted its LS signal 130 is represented by (ta), and is arbitrarily set at $10^{-7}$. 1/10 of a microsecond is a good first order approximation, and the fact that the calculations will only require solving for four unknown variables (X, Y, Z and ta) using four linear equations means that no prior knowledge of the value for ta is required.

The propagation time ($t_m$) from the instant at which the target object 124 emits its LS signal 130 to the instant at which the LS signal 130 reaches receiver 108 can be represented by the following equation (also known as the "time-distance" equation):

$$t_m := [(X - x_m)^2 + (Y - y_m)^2 + (Z - z_m)^2]^{0.5} * 1/c$$

Using the known values and equations above, the following values are obtained:

$t$: = 0.0000000222

0.0000000331

0.0000000413

0.0000000302

0.0000000145

The counter values ($C_m$) can be represented by the following equation:

$$C_m := \text{Trun}(f_c * [t_m + ta = tp_m])$$

where "Trun" means truncate the value down to the lowest integer.

The calibrated delay times ($tp_m$) must be corrected. The counter correction values ($C_m''$) can be represented by the following equation:

$$C_m'' := \text{Trun}(f_c * tp_m)$$

The corrected values ($C_m'$) can be represented by the following equation:

$$C_m' := C_m'' * f_c^{-1}$$

The above equations provide the following values

| C = 1466 | C'' = 0 | C' = 1466 | T = 0.0000001222 |
|---|---|---|---|
| 1964 | 367 | 1597 | 0.0000001331 |
| 2432 | 736 | 1696 | 0.0000001413 |
| 2173 | 610 | 1563 | 0.0000001303 |
| 1765 | 391 | 1374 | 0.0000001145 |

The distance from the predetermine spatial reference point (0,0,0) and a receiver 108 cab be represented by the following equation:

$$D_m := (x_m^2 + y_m^2 + z_m^2)^{0.5}$$

Since $t_m = T_m - ta$, we can rewrite the time distance equation as:

$$[c*(T_m-ta)]^2 := (X^2+Y^2+Z^2) + D_m^2 - 2*(X*x_m + Y*y_m + Z*z_m)$$

Since $(X^2+Y^2+Z^2)$ is independent of m, we can subtract the "m=0" equation from the above equation to obtain four linear equations. Otherwise, the system would have five non-linear equations, which are more complex to solve. Therefore, subtracting the "m=0" equation from the above equation provides:

$$c^2*(T_m^2-T_0^2) - 2*c^2*(T_m-T_0)*t_a := D_m^2 - D_0^2 - [2*X*(x_m-x_0)] - [2*Y*(y_m-y_0)] - [2*Z*(z_m-x_0)]$$

Now, we substitute the following in the above equation:

$$T_m := (C_m - C_m'')*f_c^{-1}$$

Since we have subtracted the "m=0" equation, let's redefine the index as n, which now runs from 0 to 3, and subscript the counter values with (n+1), which will then run from 1 to 4.

Because these 12 elements are geometry-dependent and should be fixed because they are the distances between the receivers, these elements of the matrix M, and vector v, can be pre-computed and stored except for those elements that are modified by the counter values $C_m$. The system of equations to be solved can be represented by the following:

$$M_{n,0} := 2*[x_{n-1} - x_0]$$

$$M_{n,1} := 2*[y_{n-1} - y_0]$$

$$M_{n,2} := 2*[z_{n-1} - x_0]$$

$$M_{n,3} := 2*c^2*(1/f_c)*([C_{n+1} - C_{n+1}''] - [C_0 - C_0''])$$

$$v_n := [D_{n+1}^2 - D_0^2] - (c/f_c)^2*([C_{n+1} - C_{n+1}'']^2 - [C_0 - C_0'']^2)$$

The parameter vector p, is computed as follows:

$$P := M^{-1} * v.$$

The processor merely performs a 4 by 4 matrix inversion of matrix M to determine the spatial coordinates of the target object 124.

The calculated spatial coordinates (x', y', z') can be represented by the following equations:

$$x' := p_0$$

$$y' := p_1$$

$$Z' := p_2$$

In this case, x'=5.5249259418, y'=20.6578457758, and z'=2.8130285224. The error between the calculated coordinates and the actual coordinates are as follows:

error in x coordinate:=x'−X−0.0349259418 error in x coordinate:=y'−Y=−0.0021542242 error in z coordinate:=z'−Z=−0.2369714776

In this example, the error in the z coordinate is approximately 3 inches.

In principle, four receivers can be employed to determine the three spatial coordinate variables and one time variable. However, the resulting equations are nonlinear and are more difficult to solve. By employing a fifth receiver, the equations can be made linear and have a very simple and practical solution.

Those skilled in the art will also appreciate that the target object 124 must be within communication range of the three-dimensional framework that is pre-programmed into the processor 105 for the locator system 90 to work.

2. Second Locator System

Figure 6:
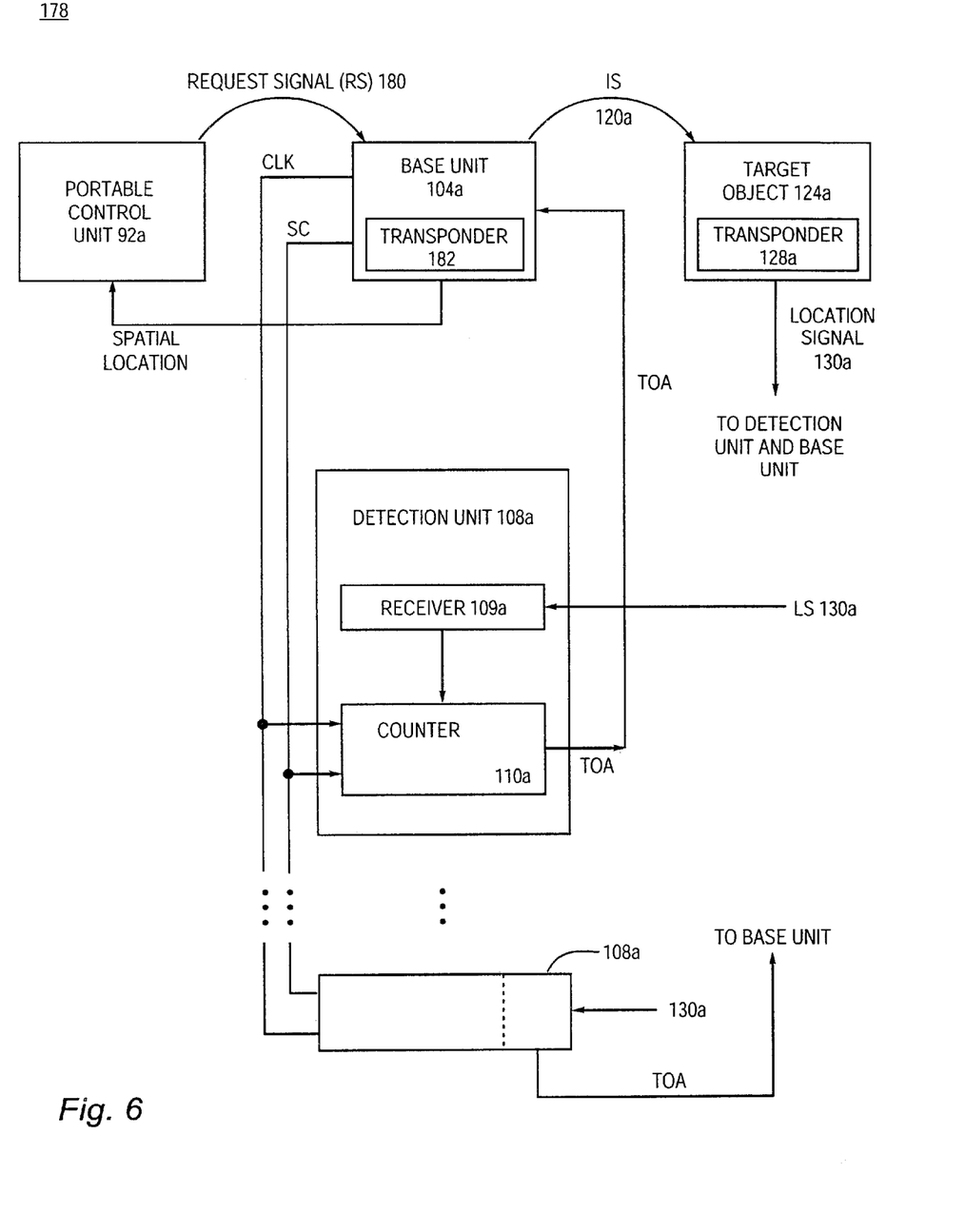
FIG. 6 is a simplified block diagram of the locator system configured according to a second preferred embodiment of the present invention.

FIG. 6 is a simplified block diagram of the locator system 178 configured according to a second preferred embodiment of the present invention. The components of locator system 178 are similar to locator system 90, except that each detection unit 108a now has its corresponding counter 110a co-located with it. Base unit 104a again includes a detection unit 108a that is co-located with it.

Upon receipt of the "FIND" command, the base unit 104a transmits a clock signal CLK and a start-count (SC) signal to each detection unit 108a, including the detection unit 108a co-located with the base unit 104a. The counter 110a of each detection unit 108a includes a clock input that is configured to receive the clock signal CLK directly from the base unit 104a.

Thereafter, the base unit 104a sends the interrogation signal (IS) 120a to the target object 124a. The IS 120a is transmitted at a predetermined time delay (e.g., 500 to 1000 counter units) after the transmission of the SC signal to ensure that the LS 130a from the transponder 128a is received at all the detection units 108a after the SC signal has been received by all the detection units 108a. Upon receipt of the IS 120a, the transponder 128a transmits the LS 130a to the detection units 108a, which causes the counters 110a at the detection units 108a to stop counting. The value at each counter 110a in the detection units 108a is the sum of (1) the transmit time from the transponder 128a to that detection unit 108a, plus (2) an unknown constant which is the transit time from the base unit 104a to the transponder 128a and the latency time within the transponder 128a, less (3) the transit time for the SC signal from the base unit 104a to that detection unit 108a (which is a known value).

Each detection unit 108a then sends it counter value to the base unit 104a. The processor at the base unit 104a determines the spatial location of the target object 124a based on these counter values, which represent the elapsed times (TOAs). The specific system of equations that are solved to determine the location (X,Y,Z) of the target object 124a is described in greater detail herein below. The spatial location of the target object 124a is then displayed at the base unit 104a, or the PCU 92a, or both. The determination of the spatial location of the target object 124a and the display of this information may be accomplished in the same manner described above for locator system 90.

Figure 7:
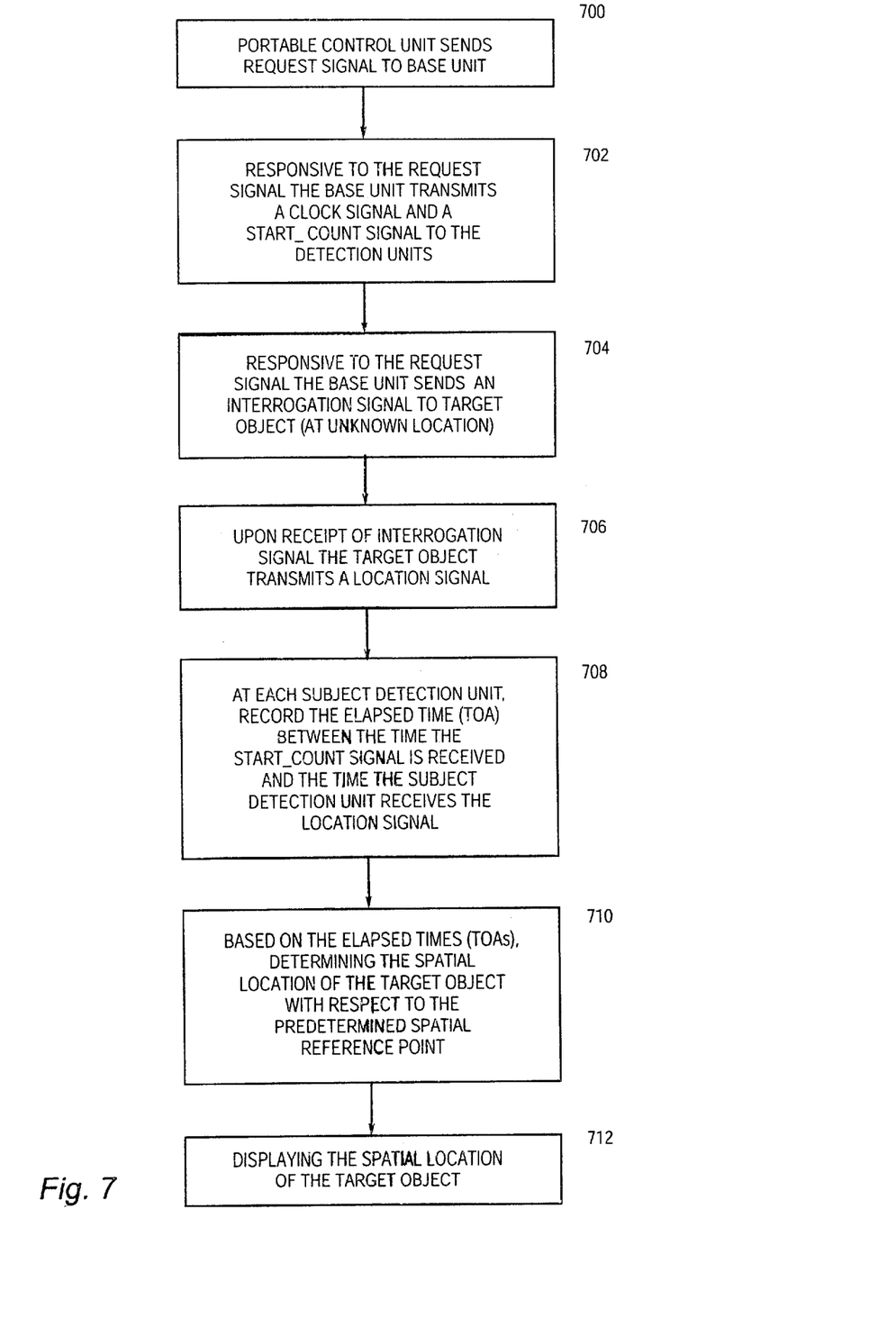
FIG. 7 is a flowchart of the method steps performed by the locator system of FIG. 6.

FIG. 7 is a flowchart of the method steps performed by the locator system 178 of FIG. 6. As with locator system 90, a user enters the ID code of a target object 124a to be located into either the PCU 92a or the base unit 104a, and then enters a "FIND" command. If the entry is made at the PCU 92a and the ID code is recognized by the PCU 92a, then in step 700, the PCU 92a transmits the ID code for the selected target object 124a (in the form of a request signal (RS) 180 and the "FIND" command to the base unit 104a by RF link. Step 700 is omitted if the user makes the entry at the base unit 104.

In step 702, the base unit 104a, responsive to the RS 180, transmits a clock signal and a start count (SC) signal to each of the detection units 108a, including the detection unit co-located at the base unit 104a. For example, a 12 GHz clock signal, which gives about a 1 inch spatial resolution, can be provided to the counters 110a at each detection unit 108a. The SC signal directs the counters 110a at each detection unit 108a to begin counting. In step 704, the base unit 104a, after a predetermined time delay, sends an interrogation signal (IS) 120a to the target object 124a.

In step 706, the target object 124a, responsive to the IS 120a, transmits a location signal (LS) 130a. In step 708, each counter 110a at the detection units 108a records the elapsed time between the time the SC signal is received by that counter 110a and the time the LS 130a is received by the subject detection unit 108a. Each detection unit 108a then sends it counter value to the base unit 104a.

In step 710, the processor disposed at the base unit 104a employs the elapsed times (TOAs) to determine the spatial location of the target object 124a based on the elapsed times (TOAs) with respect to a predetermined reference location (0,0,0). The processor identifies the location of the target object 124 in a three-dimensional spatial coordinate system. The three-dimensional spatial coordinate information is transferred from the processor to the address buffer of a text-file memory. The processor is then turned off by the base unit 104a. The three-dimensional spatial coordinate information serves as the address of a text-file-memory location which contains a word description of a physical location in the coordinate space (e.g., "on the sofa," "in Tommy's room," etc.) corresponding to each spatial-coordinate description.

In step 712, the word description text is retrieved from the text-file memory and displayed at the display in the base unit 104a, or transmitted to the PCU 92a for display, or may be displayed at both the base unit 104a and the PCU 92a. Again, the spatial location of the target object 124a may also be displayed in a three dimensional grid.

The following example illustrates how the second preferred embodiment determines the spatial location of the target object 124a. The detection units 108a are configured as in the first example, with four receivers placed approximately at four corners of a rectangle, and one receiver centered approximately ten feet above the plane of the rectangle. In this embodiment, one detection unit 108a is co-located with the base unit 104a.

Thus, there are five receivers in locations with subscripts 1 to 4. The base unit 104a and its receiver (i.e., the first receiver) is located at $(x_0, y_0, z_0)$. The target object is at the location (X, Y, Z), which is at X:=5.49; Y:=20.66; Z:=3.05. The receiver locations are as follows:

| | | | |
|---|---|---|---|
| 1st receiver | $x_0$: = 0.72 | $y_0$: = −0.55 | $z_0$: = 0.88 |
| 2nd receiver | $x_1$: = 30.8 | $y_1$: = 0.22 | $z_1$: = 2.05 |
| 3rd receiver | $x_2$: = 32.1 | $y_2$: = 50.88 | $z_2$: = −2.59 |
| 4th receiver | $x_3$: = −1.85 | $y_3$: = 49.41 | $z_3$: = 1.02 |
| 5th receiver | $x_4$: = 15.23 | $y_4$: = 25.84 | $z_4$: = 12.07 |

Two indices are defined as follows:

m:=0 . . . 4, and n:=0 . . . 3.

The m index is employed to reference the receivers.

The signal propagation time ($tp_m$) from the base unit 104a to each of the detection units 108a can be represented by the following equation:

$$tp_m := [(x_0 - x_m)^2 + (y_0 - y_m)^2 + (z_0 - z_m)^2]^{0.5} * 1/c$$

Using the known values and equations above, the following values are obtained for this example:

$$tp: = 0.0$$
$$0.0000000306$$
$$0.0000000614$$
$$0.0000000509$$
$$0.0000000327$$

The "base-to-target plus latency" transit time (ta) includes an unknown propagation time from the base unit 104a to the target object 124a plus the latency within the target object 124a (i.e., the transponder latency). As with the example for the first embodiment above, this transit time (ta) is arbitrarily set at $10^{-7}$.

The propagation time ($t_m$) from the target object 124a to the receivers 104a and 108a can be represented by the following equation:

$$(t_m := [(X - x_m)^2 + (Y - y_m)^2 + (Z - z_m)^2]^{0.5} * 1/c$$

Using the known values and equations above, the following values are obtained:

$$t: = 0.0000000222$$
$$0.0000000331$$
$$0.0000000413$$
$$0.0000000302$$
$$0.0000000145$$

The counter values ($C_m$) can be represented by the following equation:

$$C_m := Trun(f_c * [t_m + ta = tp_m])$$

where "Trun" means to truncate the value down to the lowest integer.

The counter correction values ($c_m'$) can be represented by the following equation:

$$T_m := \text{Trun}(f_c * tp_m)$$

The corrected values ($C_m'$) can be represented by the following equation:

$$C_m' := C_m + C_m''$$

The offset times ($T_m$) that are corrected can be represented by the following equation:

$$T_m := C_m' f_c^{-1}$$

The above equations provide the following values:

| C = | C" = | C' = | T = |
|---|---|---|---|
| 1466 | 0 | 1466 | 0.0000001222 |
| 1229 | 367 | 1596 | 0.0000001330 |
| 959 | 736 | 1695 | 0.0000001413 |
| 952 | 610 | 1562 | 0.0000001302 |
| 981 | 391 | 1372 | 0.0000001143 |

The distance from the the predetermined spatial reference point (0,0,0) and a receiver 104a or 108a can be represented by the following equation:

$$(x_m^2 + y_m^2 + z_m^2)^{0.5}$$

All the elements of the matrix M, and vector v, can be pre-computed and stored except for those elements that are modified by the counter values $C_m$. The system of equations to be solved can be represented by the following:

$$M_{n,0} := 2*[x_{n+1} - x_0]$$

$$M_{n,1} := 2*[y_{n+1} - y_0]$$

$$M_{n,2} := 2*[Z_{n+1} - z_0]$$

$$M_{n,3} := 2*c^2(1/f_c)*([C_{n+1} + C_0] + C_{n+1}'')$$

$$v_n := D_{n+1}^2 - D_0^2 - (c/f_c)^2*([C_{n+1} + C_{n+1}'']^2 - C_0^2$$

The parameter vector p, is computed as follows:

$$P := M^{-1} * v.$$

The processor merely performs a 4 by 4 matrix inversion of matrix M to determine the spatial coordinates of the target object 124a.

The calculated spatial coordinates (x', y', x') can be represented by the following equations:

$$x' := p_0$$

$$y' := p_1$$

$$z' := p_2$$

In this case, x'=5.5118957595, y'=20.6661693974, and z'=3.1842354318. The error between the calculated coordinates and the actual coordinates are as follows:

error in x coordinate:=x'–X–0.0218957595 error in x coordinate:=y'–Y=0.0061693974 error in z coordinate:=z'–Z=0.1342354318

In this example, the error in the z coordinate is approximately 1.6 inches.

Thus, in both locator systems 90 and 178 according to the present invention, the location of the target object 124, 124a is determined based on measuring the time intervals between a time reference and the times at which a plurality of detection units receive a location signal from the target object 124, 124a. In the first locator system 90, the time reference is the instant at which the counters 110 in the base unit 104 are started. In the second locator system 178, the time reference is the isntant at which the SC signal is issued from the base unit 104a. Those skilled in the art will appreciate that other time references can be used without departing from the spirit and scope of the present invention, and that these other time references will depend on the different configurations of the base unit and the detection units that are used to carry out the operations of the locator system.

Although certain circuits, portions, subsystems, and blocks of the UC 10 and the locator systems 90, 178 (such as the elements shown in FIGS. 3, 4 and 6) have been described above as including certain components, it will be appreciated by those skilled in the art that such disclosures are non-limiting, and that different components, or combinations thereof, can be provided for such circuits, portions, subsystems, and blocks without departing from the spirit and scope of the present invention.

In addition, the components of the portable control units 92, 92a, the target objects 124, 124a, the detection units 108, 108a, and the base units 104, 104a described hereinabove can be selected from standard and conventional components, including currently-available off-the-shelf components, or they can be components that have been specifically designed and manufactured specifically for use with the locator systems and the universal controller of the present invention.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A locator system for determining the spatial location of a target object having a particular identification code and generating a location signal in response to an interrogation signal containing the identification code, the locator system comprising:

a plurality of detection units for measuring time intervals between a time reference and the time at which the detection unit receives the location signal; and a base unit for determining the spatial location of the target object with reference to a predetermined spatial reference point based on the measured time intervals, the base unit transmitting the interrogation signal containing the identification code in response to a request to find the target object having the identification code; wherein the base unit comprises:

a plurality of counters, each corresponding to one of the detection units, each counter measuring the time interval between the time a start count signal is received and the time the detection unit receives the location signal.

2. The system of claim 1 wherein the base unit further includes:

a processor for determining the spatial location of the target object.

3. The system of claim 2 wherein upon receipt of the location signal from the target object, each detection unit transmits a stop count signal to its corresponding counter at the base unit.

4. The system of claim 3 wherein the base unit, after receiving the request to find the target object having the identification code: turns on a clock generator, provides the start count signal to start the counters, turns on the detection units, turns on the processor and transmits the interrogation signal;

and wherein the base unit, after receiving the stop count signal: turns off the clock generator, turns off the detection units and turns off the processor.

5. The system of claim 1 further comprising:

a display for displaying the spatial location of the target object.

6. The system of claim 1 wherein the base unit further includes:

a processor for determining the spatial location of the target object.

7. The system of claim 1 wherein the base unit provides a clock signal and the start-count signal.

8. A locator system for determining the spatial location of a target object having a particular identification code and generating a location signal in response to an interrogation signal containing the identification code, the locator system comprising:

a plurality of detection units for measuring time intervals between a time reference and the time at which the detection unit receives the location signal; and a base unit for determining the spatial location of the target object with reference to a predetermined spatial reference point based on the measured time intervals, the base unit transmitting the interrogation signal containing the identification code in response to a request to find the target object having the identification code; wherein each detection unit further comprises:

a counter having an input for receiving a start-count signal, the counter measuring the time interval between the time the start-count signal is received and the time the detection unit receives the location signal.

9. A method for determining the spatial location of a target object, the target object having an associated identification code and transmitting a location signal in response to an interrogation signal containing the associated identification code, the method comprising the steps of:

(a) accepting a request to find the target object having the associated identification code;

(b) determining whether the target object is a locatable object by comparing the associated identification code to pre-assigned identification codes of locatable objects;

(c) if the target object is a locatable object, transmitting an interrogation signal containing the associated identification code of the target object;

(d) receiving the location signal from the target object at a plurality of known locations;

(e) measuring and recording a plurality of elapsed times at the plurality of known locations, each elapsed time representing the difference between a time reference and the time of receipt of the location signal at the known location; wherein step (e) further comprises the steps of:

(e1) providing a plurality of counters at a base unit, each counter corresponding to one of the known locations;

(e2) starting each counter; and (e3) transmitting a stop count signal from each known location to its corresponding counter at the base unit upon receipt of the location signal from the target object at the known location, with the counter value at each counter after receipt of the stop count signal representing the elapsed time; and (f) based on the elapsed times, determining the spatial location of the target object with respect to a predetermined spatial reference point.

10. The method of claim 9 further comprising the steps of:

displaying the spatial location with respect to a predetermined spatial reference point.

11. The method of claim 9 further comprising the steps of:

transmitting the spatial location to a remote location; and displaying the spatial location with respect to a predetermined spatial reference point.

12. A locator system for determining the spatial location of a target object having a particular identification code and generating a location signal in response to an interrogation signal containing the identification code, the locator system comprising:

a plurality of detection units for measuring time intervals between a time reference and the time at which the detection unit receives the location signal;

a base unit for determining the spatial location of the target object with reference to a predetermined spatial reference point based on the measured time intervals, the base unit transmitting the interrogation signal containing the identification code in response to a request to find the target object having the identification code; and a portable control unit remote from the base unit, wherein the identification codes for all locatable target objects are stored in the portable control unit, and wherein the portable control unit accepts from a user the identification code of a particular target object, and if that identification code is recognized transmits to the base unit the request to find the target object.

13. A locator system comprising a portable control unit, a base unit having a processor, a plurality of detection units positioned at known locations, a counter associated with each detection unit, and transponders for attachment to each locatable object, wherein:

the portable control unit stores an identification code for each locatable object, accepts a user request to find a target object, references the stored identification codes to determine whether the target object is a locatable object, and sends a request signal containing the identification code corresponding to the target object;

the base unit receives the request signal, starts the counters and sends an interrogation signal containing the identification code corresponding to the target object;

the transponder associated with the target object recognizes the interrogation signal and sends a location signal in response;

the detection units receive the location signal and stop the counters in response; and the processor determines the location of the target object based on the time elapsed in each counter.

* * * * *